US010038521B2

(12) United States Patent
Yang et al.

(10) Patent No.: US 10,038,521 B2
(45) Date of Patent: Jul. 31, 2018

(54) METHOD FOR TRANSMITTING CONTROL INFORMATION AND AN APPARATUS THEREFOR

(71) Applicant: LG ELECTRONICS INC., Seoul (KR)

(72) Inventors: Suckchel Yang, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 63 days.

(21) Appl. No.: 15/236,170

(22) Filed: Aug. 12, 2016

(65) Prior Publication Data

US 2017/0048846 A1 Feb. 16, 2017

Related U.S. Application Data

(60) Provisional application No. 62/203,933, filed on Aug. 12, 2015, provisional application No. 62/367,131, filed on Jul. 27, 2016.

(51) Int. Cl.
*H04W 4/00* (2018.01)
*H04L 1/18* (2006.01)
*H04L 5/00* (2006.01)

(52) U.S. Cl.
CPC .......... *H04L 1/1812* (2013.01); *H04L 1/1893* (2013.01); *H04L 5/001* (2013.01); *H04L 5/0055* (2013.01)

(58) Field of Classification Search
CPC ............................ H04L 1/1812; H04L 1/1893
USPC ......................................................... 370/329
See application file for complete search history.

(56) References Cited

U.S. PATENT DOCUMENTS

| 2013/0114575 | A1* | 5/2013 | Fu | ......................... | H04L 5/0053 |
| | | | | | 370/336 |
| 2013/0182675 | A1* | 7/2013 | Ahn | ...................... | H04L 1/1861 |
| | | | | | 370/329 |
| 2017/0005768 | A1* | 1/2017 | Yin | ....................... | H04L 5/0055 |

* cited by examiner

*Primary Examiner* — Samina Choudhry
(74) *Attorney, Agent, or Firm* — Lee Hong Degerman Kang Waimey

(57) ABSTRACT

The present invention relates to a wireless communication system. In a method of transmitting control information and apparatus therefor, the present invention includes receiving a PDCCH (physical control shared channel) having HARQ-ACK resource indication information in a first cell among a plurality of cells, receiving a first PDSCH (physical downlink shared channel) corresponding to the PDCCH in a second cell among a plurality of the cells, and transmitting HARQ-ACK for the first PDSCH through one of a first PUCCH (physical uplink control channel) format and a second PUCCH format. If the first cell is PCell (primary cell), the HARQ-ACK resource indication information indicates a resource of the first PUCCH format only. If the first cell is SCell (secondary cell), the HARQ-ACK resource indication information indicates one of the resource of the first PUCCH and a resource of the second PUCCH format.

6 Claims, 10 Drawing Sheets

PUCCH format 1a and 1b structure (normal CP case)

METHOD FOR TRANSMITTING CONTROL INFORMATION AND AN APPARATUS THEREFOR

CROSS-REFERENCE TO RELATED APPLICATIONS

Pursuant to 35 U.S.C. § 119(e), this application claims the benefit of U.S. Provisional Patent Application No. 62/203,933, filed on Aug. 12, 2015 and 62/367,131, filed on Jul. 27, 2016, the contents of which are all hereby incorporated by reference herein in their entirety.

TECHNICAL FIELD

The present invention relates to a wireless communication system and, more particularly, to a method for transmitting control information and an apparatus for the same.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as code division multiple access (CDMA), frequency division multiple access (FDMA), time division multiple access (TDMA), orthogonal frequency division multiple access (OFDMA), or single carrier frequency division multiple access (SC-FDMA).

DISCLOSURE

Technical Task

An object of the present invention is to provide a method for efficiently transmitting control information in a wireless communication system and an apparatus for the same. Another object of the present invention is to provide a method of efficiently transmitting uplink control information efficiently in a CA (carrier aggregation system) and managing a resource for the same efficiently and apparatus therefor.

The technical problems solved by the present invention are not limited to the above technical problems and those skilled in the art may understand other technical problems from the following description.

Technical Solution

In one technical aspect of the present invention, provided herein is a method of transmitting HARQ-ACK (hybrid ARQ acknowledgement) information by a user equipment in a wireless communication system, including receiving a PDCCH (physical control shared channel) having HARQ-ACK resource indication information in a first cell among a plurality of cells, receiving a first PDSCH (physical downlink shared channel) corresponding to the PDCCH in a second cell among a plurality of the cells, and transmitting HARQ-ACK for the first PDSCH through one of a first PUCCH (physical uplink control channel) format and a second PUCCH format, wherein if the first cell is PCell (primary cell), the HARQ-ACK resource indication information indicates a resource of the first PUCCH format only and wherein if the first cell is SCell (secondary cell), the HARQ-ACK resource indication information indicates one of the resource of the first PUCCH and a resource of the second PUCCH format.

In another technical aspect of the present invention, provided herein is a user equipment used for a wireless communication system, including an RF (radio frequency) unit and a processor configured to receive a PDCCH (physical control shared channel) having HARQ-ACK resource indication information in a first cell among a plurality of cells, receive a first PDSCH (physical downlink shared channel) corresponding to the PDCCH in a second cell among a plurality of the cells, and transmit HARQ-ACK for the first PDSCH through one of a first PUCCH (physical uplink control channel) format and a second PUCCH format, wherein if the first cell is PCell (primary cell), the HARQ-ACK resource indication information indicates a resource of the first PUCCH format only and wherein if the first cell is SCell (secondary cell), the HARQ-ACK resource indication information indicates one of the resource of the first PUCCH and a resource of the second PUCCH format.

Preferably, if the first cell is the PCell and only the first PDSCH is received in a plurality of the cells, the HARQ-ACK for the first PDSCH may be transmitted through the second PUCCH format, and the resource of the second PUCCH format may be determined based on an index of a resource used for a transmission of the PDCCH.

More preferably, if the first cell is the PCell and a second PDCCH is further received in a plurality of the cells, the HARQ-ACK for the first PDSCH may be transmitted through the first PUCCH format, and the resource of the first PUCCH format may be indicated by the HARQ-ACK resource indication information.

Preferably, if the first cell is the PCell and only the first PDSCH is received in a plurality of the cells, the HARQ-ACK resource indication information may be ignored in determining a PUCCH resource.

Preferably, if the first cell is the SCell and the HARQ-ACK resource indication information indicates the resource of the second PUCCH format, the resource of the second PUCCH format may be allocated in advance by RRC (radio resource control) signaling.

Preferably, the second cell may include the SCell.

Preferably, the first PUCCH format may include PUCCH format 3 or PUCCH format 4, and the second PUCCH format may include PUCCH format 1a or PUCCH format 1b.

Advantageous Effects

According to the present invention, it is possible to efficiently transmit control information in a wireless communication system. Particularly, uplink control information can be efficiently transmitted and a resource for the same can be efficiently managed.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention, illustrate embodiments of the invention and together with the description serve to explain the principle of the invention. In the drawings.

MODE FOR INVENTION

Embodiments of the present invention are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3$^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) evolves from 3GPP LTE.

While the following description is given, centering on 3GPP LTE/LTE-A for clarity, this is purely exemplary and thus should not be construed as limiting the present invention. It should be noted that specific terms disclosed in the present invention are proposed for convenience of description and better understanding of the present invention, and the use of these specific terms may be changed to other formats within the technical scope or spirit of the present invention.

Figure 1:
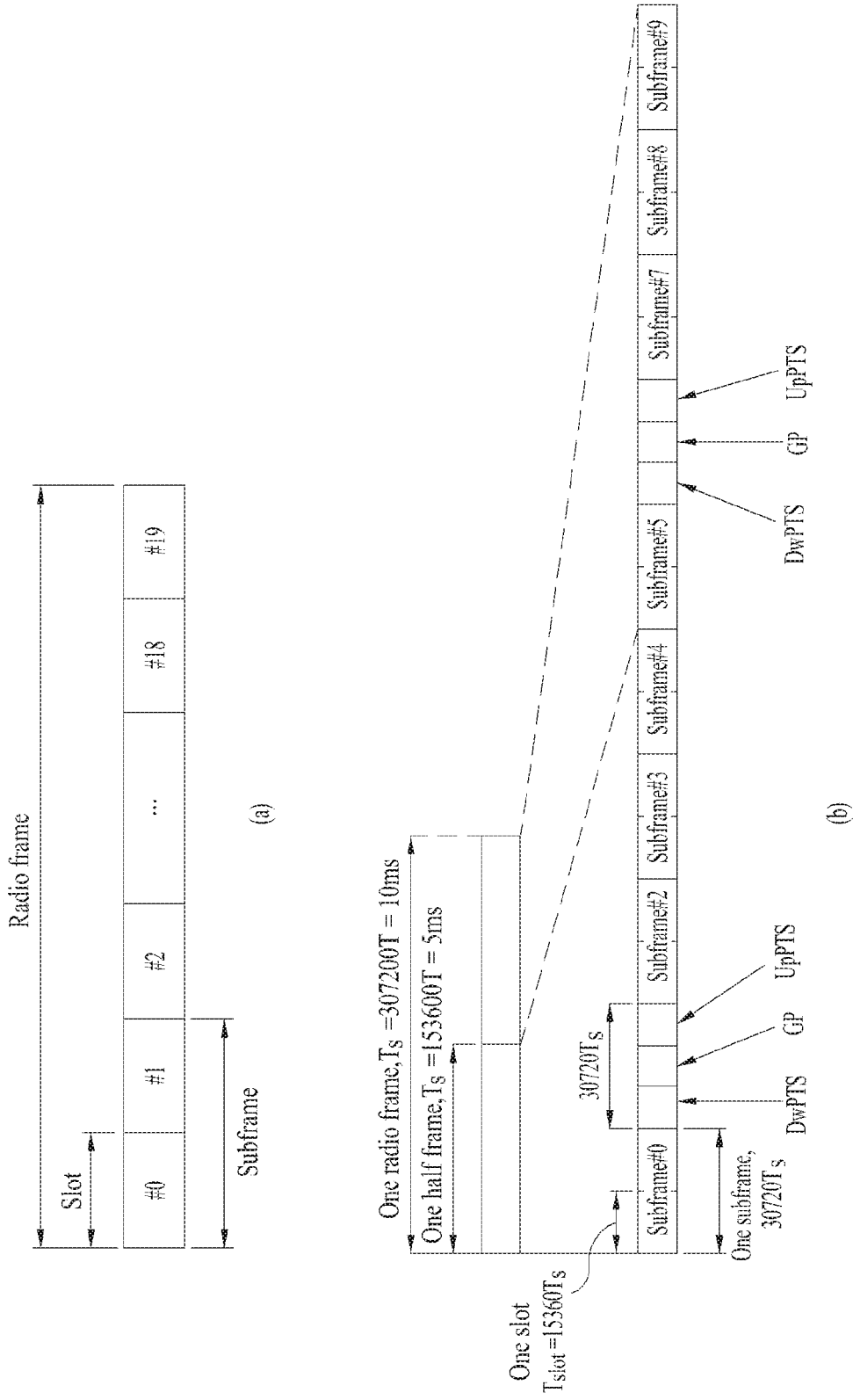
FIG. 1 illustrates a radio frame structure.

FIG. 1 illustrates a radio frame structure. In a cellular OFDM wireless packet communication system, uplink/downlink data packet transmission is performed on a subframe-by-subframe basis. A subframe is defined as a predetermined time interval including a plurality of OFDM symbols. LTE(-A) supports a type-1 radio frame structure for FDD (frequency division duplex) and a type-2 radio frame structure for TDD (time division duplex).

FIG. 1(a) illustrates a type-1 radio frame structure. A downlink radio frame includes 10 subframes each of which includes 2 slots in the time domain. A time for transmitting a subframe is defined as a transmission time interval (TTI). For example, each subframe has a length of 1 ms and each slot has a length of 0.5 ms. A slot includes a plurality of OFDM symbols in the time domain and includes a plurality of resource blocks (RBs) in the frequency domain. Since downlink uses OFDM in LTE(-A), an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on Cyclic Prefix (CP) configuration. When an OFDM symbol is configured with the normal CP, for example, the number of OFDM symbols included in one slot may be 7. When an OFDM symbol is configured with the extended CP, the number of OFDM symbols included in one slot may be 6.

FIG. 1(b) illustrates a type-2 radio frame structure. The type-2 radio frame includes 2 half frames. Each half frame includes 5 subframes. One subframe consists of 2 slots.

Table 1 shows UL-DL configurations (UL-DL Cfg) of subframes in a radio frame in the TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe.

The special subframe includes DwPTS (Downlink Pilot TimeSlot), GP (Guard Period), and UpPTS (Uplink Pilot TimeSlot). DwPTS is a period reserved for downlink transmission and UpPTS is a period reserved for uplink transmission.

Table 2 shows DwPTS/GP/UpPTS lengths according to special subframe configurations. In Table 2, Ts denotes sampling time.

TABLE 2

| Special subframe configuration | DwPTS | Normal cyclic prefix in downlink | | Extended cyclic prefix in downlink | | |
|---|---|---|---|---|---|---|
| | | UpPTS | | | UpPTS | |
| | | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The radio frame structure is exemplary and the number of subframes, the number of slots and the number of symbols in a radio frame can vary.

Figure 2:
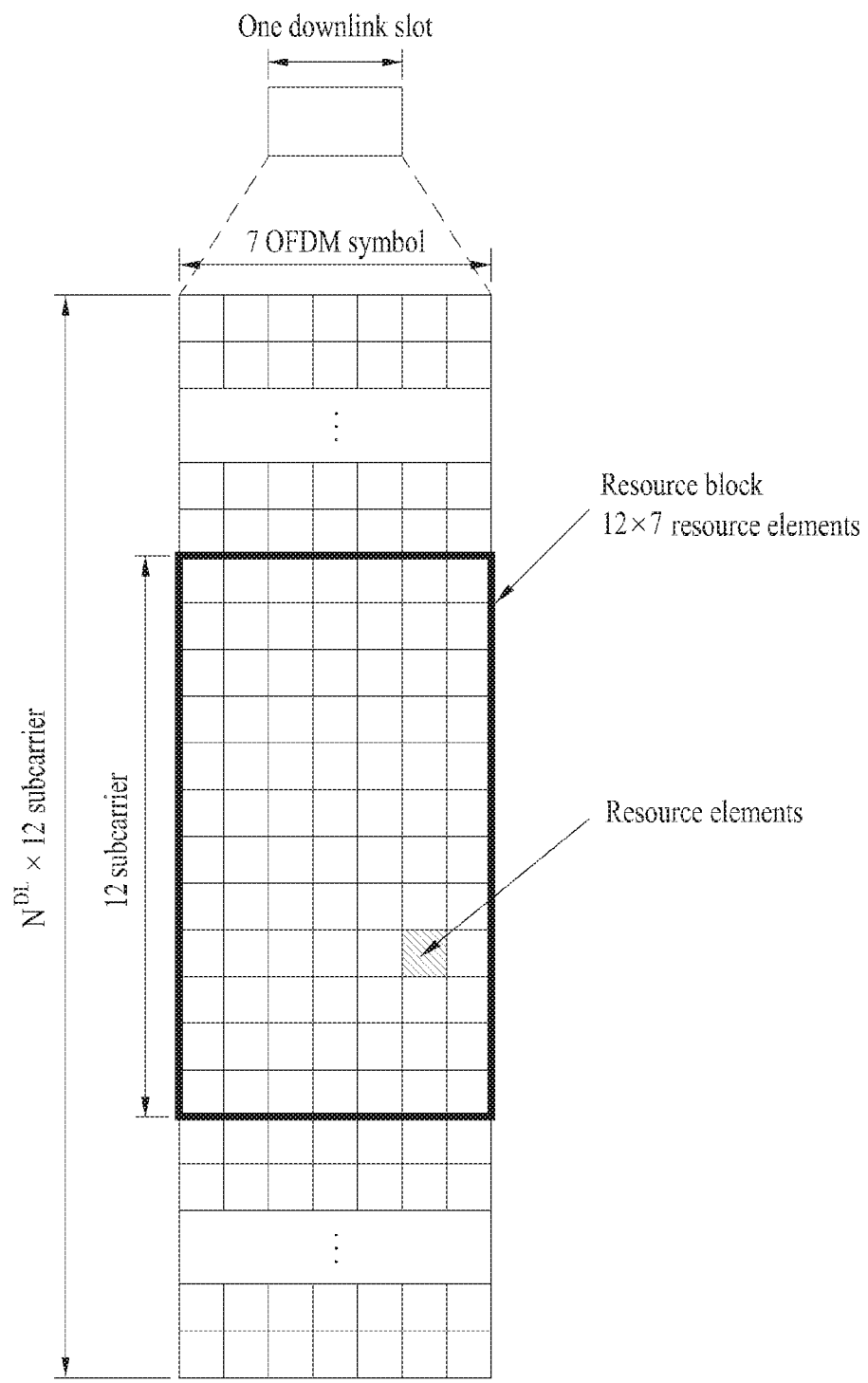
FIG. 2 illustrates a resource grid of a downlink slot.

FIG. 2 illustrates a resource grid of a downlink slot.

Referring to FIG. 2, a downlink slot includes a plurality of OFDM symbols in the time domain. One downlink slot may include 7(6) OFDM symbols, and one resource block (RB) may include 12 subcarriers in the frequency domain. Each element on the resource grid is referred to as a resource element (RE). One RB includes 12×7(6) REs. The number $N_{RB}$ of RBs included in the downlink slot depends on a downlink transmit bandwidth. The structure of an uplink slot may be same as that of the downlink slot except that OFDM symbols by replaced by SC-FDMA symbols.

Figure 3:
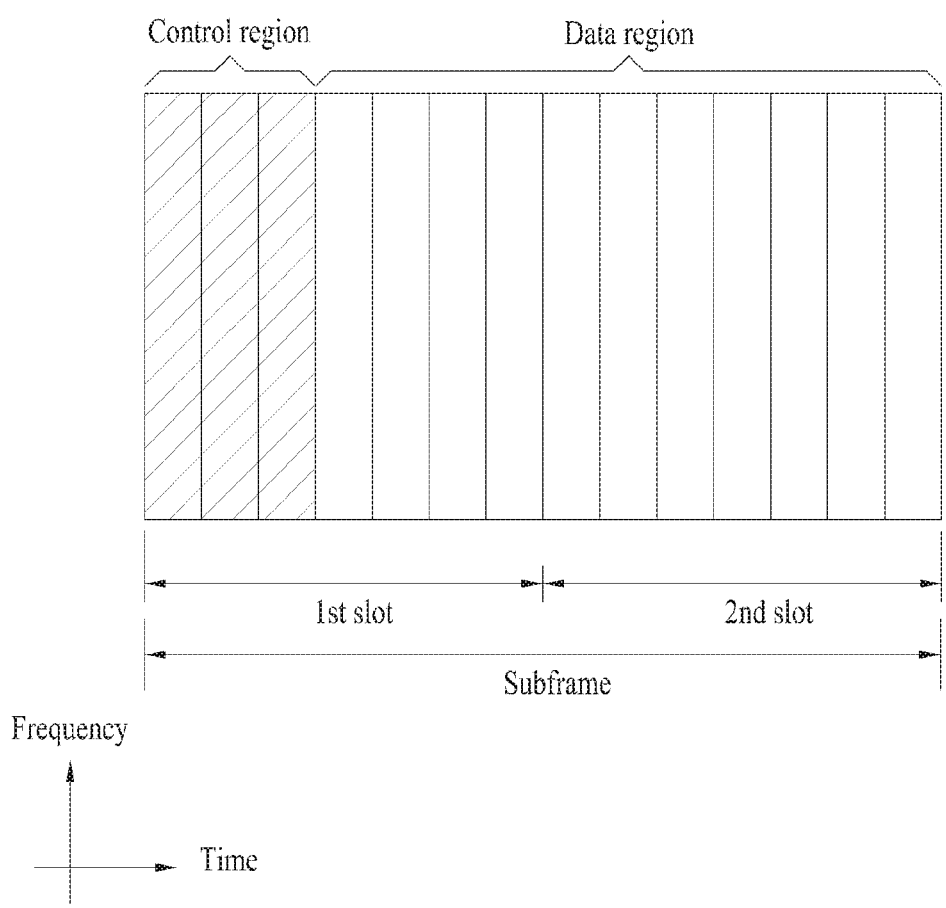
FIG. 3 illustrates a downlink subframe structure.

FIG. 3 illustrates a downlink subframe structure.

Referring to FIG. 3, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. The DCI formats selectively include information such as hopping flag, RB allocation, MCS (Modulation Coding Scheme), RV (Redundancy Version), NDI (New Data Indicator), TPC (Transmit Power Control), cyclic shift DM RS (Demodulation Reference Signal), CQI (Channel Quality Information) request, HARQ process number, TPMI (Transmitted Precoding Matrix Indicator), PMI (Precoding Matrix Indicator) confirmation according as necessary.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

Figure 4:
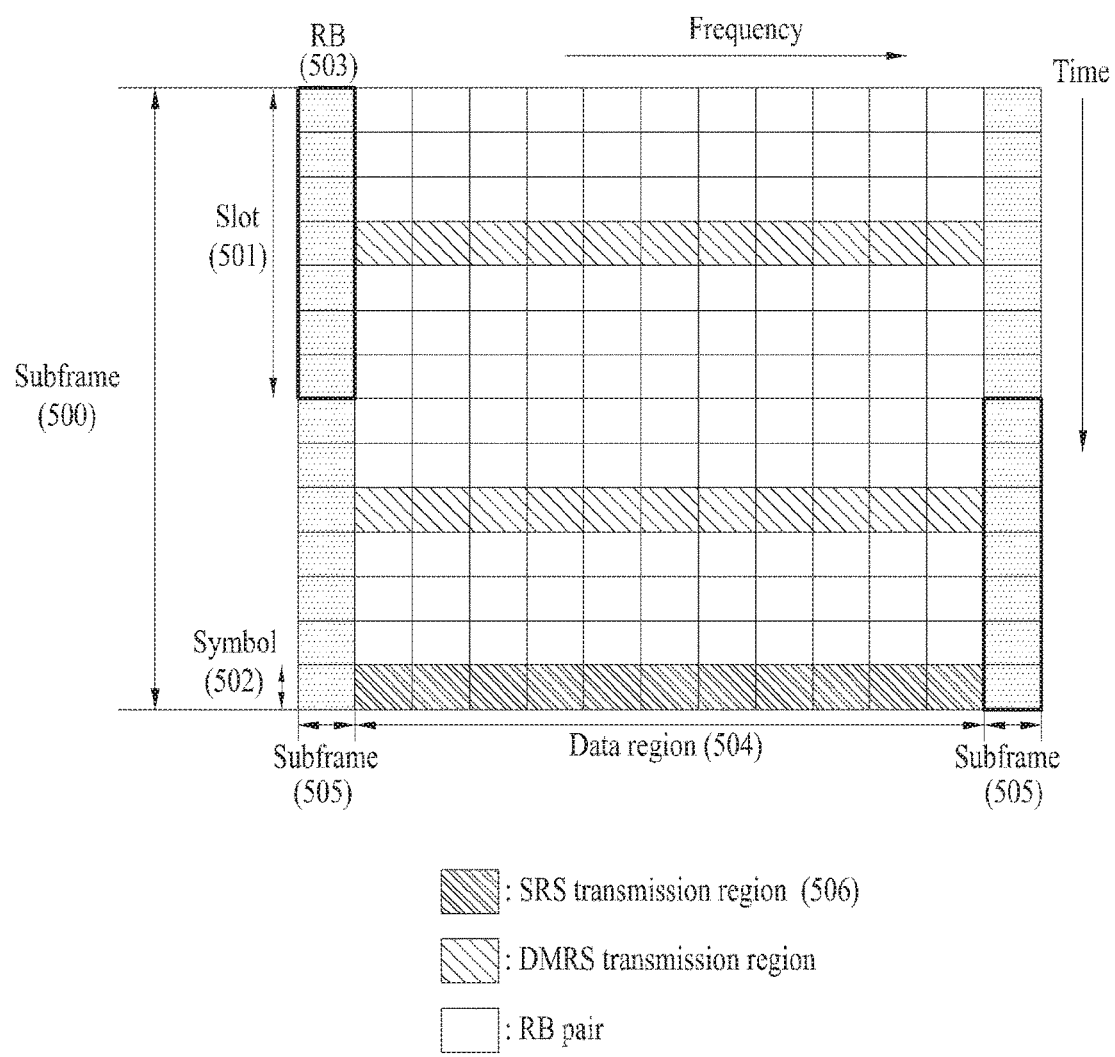
FIG. 4 illustrates the structure of an uplink subframe.

FIG. 4 illustrates an uplink subframe structure.

Referring to FIG. 4, an uplink subframe includes a plurality of (e.g. 2) slots. A slot may include different numbers of SC-FDMA symbols according to CP lengths. The uplink subframe is divided into a control region and a data region in the frequency domain. The data region is allocated with a PUSCH and used to carry a data signal such as audio data. The control region is allocated a PUCCH and used to carry uplink control information (UCI). The PUCCH includes an RB pair located at both ends of the data region in the frequency domain and hopped in a slot boundary.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords.

Channel Quality Indicator (CQI): This is feedback information about a downlink channel. Feedback information regarding Multiple Input Multiple Output (MIMO) includes Rank Indicator (RI) and Precoding Matrix Indicator (PMI). 20 bits are used for each subframe.

Table 3 shows the mapping relationship between PUCCH formats and UCI in LTE.

TABLE 3

| PUCCH format | UCI (Uplink Control Information) |
|---|---|
| Format 1 | SR (Scheduling Request) (non-modulated waveform |
| Format 1a | 1-bit HARQ ACK/NACK (SR exist/non-exist) |
| Format 1b | 2-bit HARQ ACK/NACK (SR exist/non-exist) |
| Format 2 | CQI (20 coded bits) |
| Format 2 | CQI and 1- or 2-bit HARQ ACK/NACK (20 bits) (corresponding to only extended CP) |
| Format 2a | CQI and 1-bit HARQ ACK/NACK (20 + 1 coded bits) |
| Format 2b | CQI and 2-bit HARQ ACK/NACK (20 + 2 coded bits) |
| Format 3 (LTE-A) | HARQ ACK/NACK + SR (48 bits) |

Figure 5:
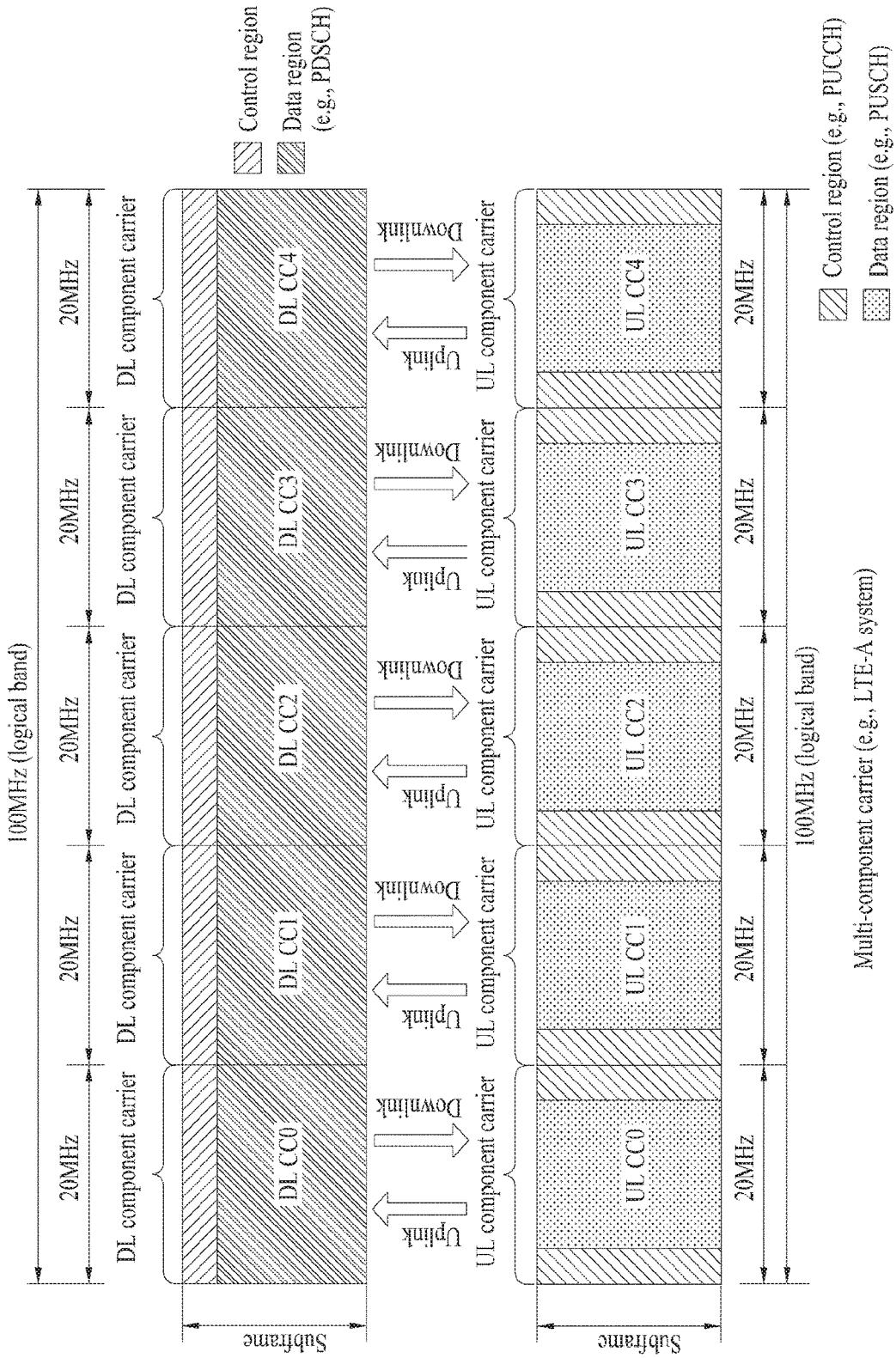
FIG. 5 illustrates a carrier aggregation (CA)-based wireless communication system.

FIG. 5 illustrates a carrier aggregation (CA) communication system. To use a wider frequency band, an LTE-A system employs CA (or bandwidth aggregation) technology which aggregates a plurality of UL/DL frequency blocks to obtain a wider UL/DL bandwidth. Each frequency block is transmitted using a component carrier (CC). The CC can be regarded as a carrier frequency (or center carrier, center frequency) for the frequency block.

Referring to FIG. 5, a plurality of UL/DL CCs can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. For example, when there are two DL CCs and one UL CC, the DL CCs can correspond to the UL CC in the ratio of 2:1. A DL CC/UL CC link can be fixed or semi-statically configured in the system. Even if the system bandwidth is configured with N CCs, a frequency band that a specific UE can monitor/receive can be limited to L (<N) CCs. Various parameters with respect to CA can be set cell-specifically, UE-group-specifically, or UE-specifically. Control information may be transmitted/received only through a specific CC. This specific CC can be referred to as a Primary CC (PCC) (or anchor CC) and other CCs can be referred to as Secondary CCs (SCCs).

In LTE-A, the concept of a cell is used to manage radio resources [refer to 36.300 V10.2.0 (2010-12) 5.5. Carrier Aggregation; 7.5. Carrier Aggregation]. A cell is defined as a combination of downlink resources and uplink resources. Yet, the uplink resources are not mandatory. Therefore, a cell may be composed of downlink resources only or both downlink resources and uplink resources. The linkage between the carrier frequencies (or DL CCs) of downlink resources and the carrier frequencies (or UL CCs) of uplink resources may be indicated by system information. A cell operating in primary frequency resources (or a PCC) may be referred to as a primary cell (PCell) and a cell operating in secondary frequency resources (or an SCC) may be referred to as a secondary cell (SCell). The PCell is used for a UE to establish an initial connection or re-establish a connection. The PCell may refer to a cell indicated during handover. The SCell may be configured after an RRC connection is established and may be used to provide additional radio resources. The PCell and the SCell may collectively be referred to as a serving cell. Accordingly, a single serving cell composed of a PCell only exists for a UE in an RRC_Connected state, for which CA is not set or which does not support CA. On the other hand, one or more serving cells exist, including a PCell and entire SCells, for a UE in an RRC_CONNECTED state, for which CA is set. For CA, a network may configure one or more SCells in addition to an initially configured PCell, for a UE supporting CA during connection setup after an initial security activation operation is initiated.

When cross-carrier scheduling (or cross-CC scheduling) is applied, a PDCCH for downlink allocation can be transmitted on DL CC #0 and a PDSCH corresponding thereto can be transmitted on DL CC #2. For cross-CC scheduling, introduction of a carrier indicator field (CIF) can be considered. Presence or absence of the CIF in a PDCCH can be determined by higher layer signaling (e.g. RRC signaling) semi-statically and UE-specifically (or UE group-specifically). The baseline of PDCCH transmission is summarized as follows.

CIF disabled: a PDCCH on a DL CC is used to allocate a PDSCH resource on the same DL CC or a PUSCH resource on a linked UL CC.

CIF enabled: a PDCCH on a DL CC can be used to allocate a PDSCH or PUSCH resource on a specific DL/UL CC from among a plurality of aggregated DL/UL CCs using the CIF.

When the CIF is present, the BS can allocate a PDCCH monitoring DL CC to reduce BD complexity of the UE. The PDCCH monitoring DL CC set includes one or more DL CCs as parts of aggregated DL CCs and the UE detects/decodes a PDCCH only on the corresponding DL CCs. That is, when the BS schedules a PDSCH/PUSCH for the UE, a PDCCH is transmitted only through the PDCCH monitoring DL CC set. The PDCCH monitoring DL CC set can be set in a UE-specific, UE-group-specific or cell-specific manner. The term "PDCCH monitoring DL CC" can be replaced by the terms such as "monitoring carrier" and "monitoring cell". The term "CC" aggregated for the UE can be replaced by the terms such as "serving CC", "serving carrier" and "serving cell".

Figure 6:
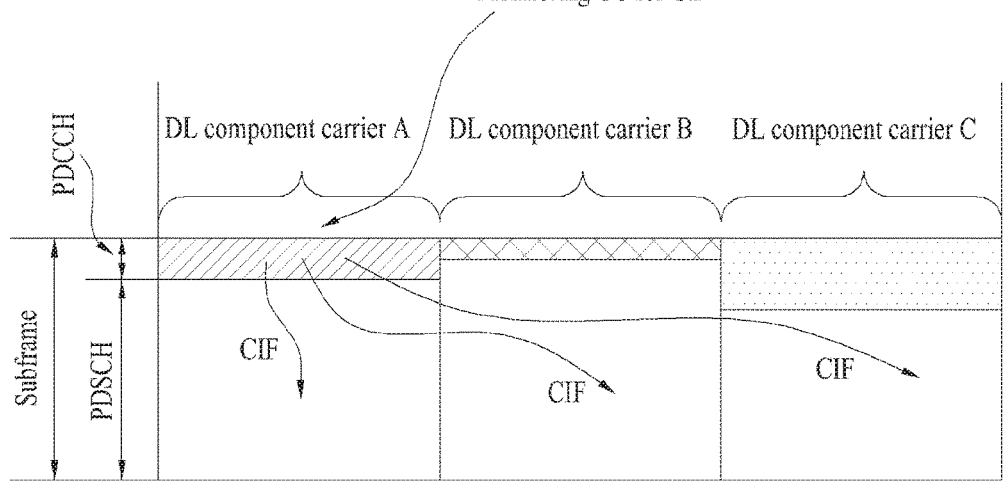
FIG. 6 illustrates a scheduling method when a plurality of cells is configured.

FIG. 6 illustrates scheduling when a plurality of carriers is aggregated. It is assumed that 3 DL CCs are aggregated and DL CC A is set to a PDCCH CC. DL CC A, DL CC B and DL CC C can be called serving CCs, serving carriers, serving cells, etc. In case of CIF (Carrier Indicator Field) disabled, a DL CC can transmit only a PDCCH that schedules a PDSCH corresponding to the DL CC without a CIF (non-cross-CC scheduling). When the CIF is enabled according to UE-specific (or UE-group-specific or cell-specific) higher layer signaling, a specific CC (e.g. DL CC A) can transmit not only a PDCCH that schedules the PDSCH corresponding to the DL CC A but also PDCCHs that schedule PDSCHs of other DL CCs using the CIF (cross-CC scheduling). A PDCCH is not transmitted in DL CC B/C.

Figure 7:
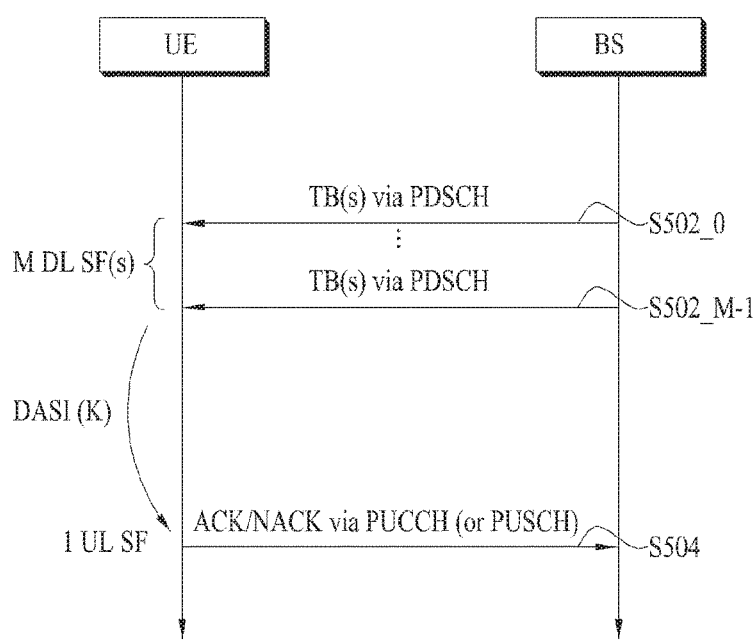
FIG. 7 illustrates a TDD UL ACK/NACK transmission process in a single cell situation.

FIG. 7 illustrates a TDD UL ACK/NACK transmission process in a single cell situation.

Referring to FIG. 7, a UE can receive one or more DL signals (e.g. PDSCH signals) in M DL subframes (SFs)

(S502_0 to S502_M-1). Each PDSCH signal is used to transmit one or more (e.g. 2) transport blocks (TBs) (or codewords) according to transmission mode. A PDCCH signal requiring an ACK/NACK response, for example, a PDCCH signal indicating SPS (semi-persistent scheduling) release (simply, SPS release PDCCH signal) may also be received in step S502_0 to S502_M-1, which is not shown. When a PDSCH signal and/or an SPS release PDCCH signal are present in the M DL subframes, the UE transmits ACK/NACK through a UL subframe corresponding to the M DL subframes via processes for transmitting ACK/NACK (e.g. ACK/NACK (payload) generation, ACK/NACK resource allocation, etc.) (S504). ACK/NACK includes acknowledgement information about the PDSCH signal and/or an SPS release PDCCH received in step S502_0 to S502_M-1. While ACK/NACK is transmitted through a PUCCH basically, ACK/NACK can be transmitted through a PUSCH when a PUSCH is transmitted at ACK/NACK transmission time. Various PUCCH formats shown in Table 3 can be used for ACK/NACK transmission. To reduce the number of transmitted ACK/NACK bits, various methods such as ACK/NACK bundling and ACK/NACK channel selection can be used.

As described above, in TDD, ACK/NACK relating to data received in the M DL subframes is transmitted through one UL subframe (i.e. M DL SF(s): 1 UL SF) and the relationship therebetween is determined by a DASI (Downlink Association Set Index).

Table 4 shows DASI (K: {k0, k1, . . . , $k_{M-1}$}) defined in LTE(-A). Table 4 shows spacing between a UL subframe transmitting ACK/NACK and a DL subframe relating to the UL subframe. Specifically, when a PDCCH that indicates PDSCH transmission and/or (downlink) SPS release is present in a subframe n−k (k∈K), the UE transmits ACK/NACK in a subframe n.

by BPSK (Binary Phase Shift Keying) modulation scheme and QPSK (Quadrature Phase Shift Keying) modulation scheme, respectively, and a single ACK/NACK modulated symbol is generated [d0]. In the ACK/NACK information, each bit [b(i), i=0, 1] indicates HARQ response for a corresponding transport block. In case of a positive ACK, the corresponding bit is given as 1. In case of a negative ACK (NACK), the corresponding bit is given as 0. Table 5 shows a modulation table defined for PUCCH format 1a/1b in the legacy LTE.

TABLE 5

| PUCCH format | b(0), . . . , b($M_{bit}$ − 1) | d(0) |
| --- | --- | --- |
| 1a | 0 | 1 |
|  | 1 | −1 |
| 1b | 00 | 1 |
|  | 01 | −j |
|  | 10 | j |
|  | 11 | −1 |

PUCCH format 1a/1b performs a cyclic shift (αcs, x) in a frequency domain and performs a spread in a time domain using orthogonal spread code (e.g., Walsh-Hadamard, DFT code) (w0, w1, w2, w3). Since code multiplexing is used in each of the frequency and time domains, more user equipments can be multiplexed on the same PUCCH RB.

Figure 9:
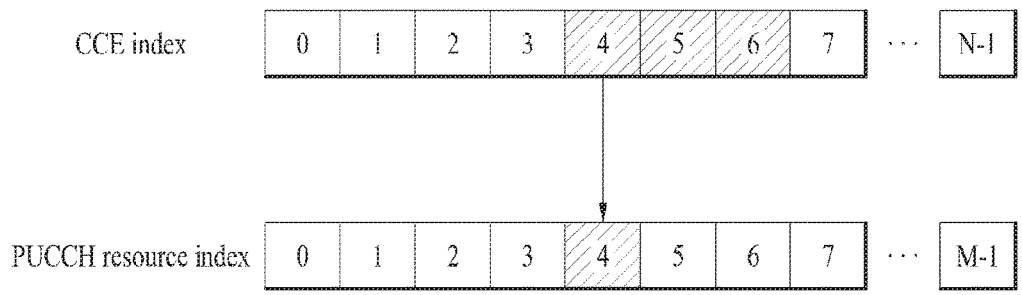
FIG. 9 illustrates an example for deciding PUCCH format 1a/1b resources for ACK/NACK.

FIG. 9 shows an example for deciding PUCCH format 1a/1b resources for ACK/NACK. PUCCH 1a/1b resources for ACK/NACK are not pre-allocated to each UE, and several UEs located in the cell are configured to divisionally use several PUCCH resources at every time point. In more detail, PUCCH 1a/1b resources used for ACK/NACK transmission of a UE may correspond to a PDCCH that carries scheduling information of the corresponding DL data. The

TABLE 4

| UL-DL Configuration | Subframe n | | | | | | | | | |
| --- | --- | --- | --- | --- | --- | --- | --- | --- | --- | --- |
|  | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Meanwhile, in FDD, ACK/NACK for data received in a single DL subframe is transmitted a single UL subframe, where k=4. Namely, in case that PDSCH transmission and/or SPS release PDCCH exists in subframe n−4, a user equipment transmits a corresponding ACK/NACK in subframe n.

Figure 8:
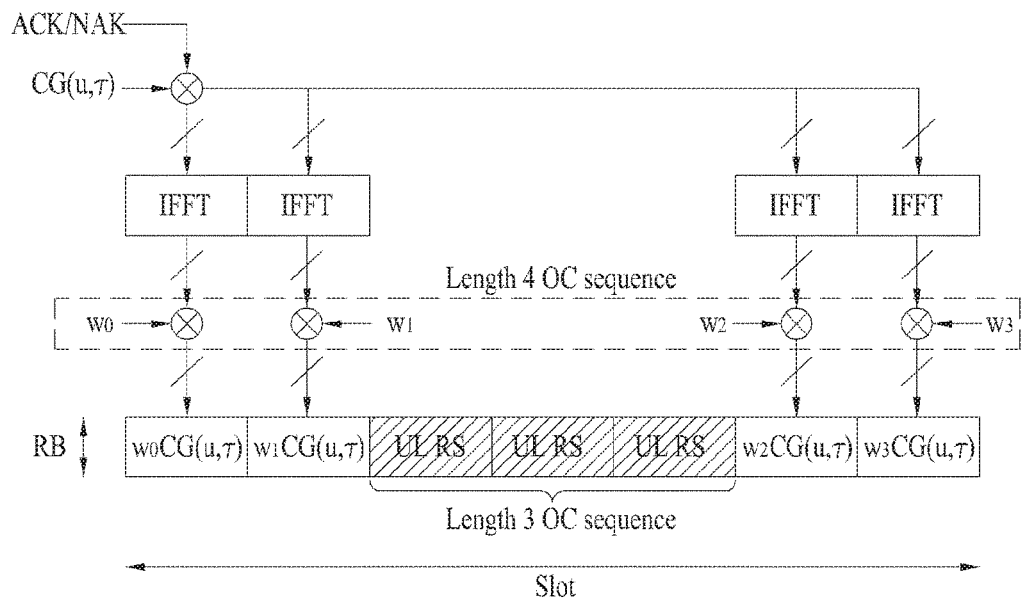
FIG. 8 illustrates slot level structures of Physical Uplink Control Channel (PUCCH) formats 1a/1b.

FIG. 8 illustrates a slot level structure of Physical Uplink Control Channel (PUCCH) format 1a/1b. PUCCH format 1a/1b is used for ACK/NACK transmission. In case of a normal CP, SC-FDMA #2/#3/#4 is used for DM RS (Demodulation Reference Signal) transmission. In case of an extended CP, SC-FDMA #2/#3 is used for DM RS transmission. Hence, 4 SC-FDMA symbols in a slot are used for ACK/NACK transmission. For clarity, PUCCH format 1a/1b shall be commonly called PUCCH format 1.

Referring to FIG. 8, 1-bit [b(0)] ACK/NACK information and 2-bit [b(0)b(1)] ACK/NACK information are modulated entire region to which a PDCCH is transmitted in each DL subframe is comprised of a plurality of Control Channel Elements (CCEs), and a PDCCH transmitted to the UE is comprised of one or more CCEs. The UE may transmit ACK/NACK through PUCCH resources (e.g., first CCE) from among CCEs constructing a PDCCH received by the UE.

Referring to FIG. 9, each block in a Downlink Component Carrier (DL CC) represents a CCE and each block in an Uplink Component Carrier (UL CC) indicates a PUCCH resource. Each PUCCH resource index may correspond to a PUCCH resource for an ACK/NACK signal. If information on a PDSCH is delivered on a PDCCH composed of CCEs #4#6, as shown in FIG. 9, a UE transmits an ACK/NACK signal on PUCCH #4 corresponding to CCE #4, the first CCE of the PDCCH. FIG. 9 illustrates a case in which a maximum of M PUCCHs are present in the UL CC when a maximum of N CCEs exist in the DL CC. Though N may be identical to M (M=M), N may differ from M and CCEs may be mapped to PUCCHs in an overlapped manner.

Specifically, a PUCCH 1a/1b resource index in an LTE system is determined as follows.

$$n^{(1)}_{PUCCH} = n_{CCE} + N^{(1)}_{PUCCH} \quad \text{[Equation 1]}$$

Here, $n^{(1)}_{PUCCH}$ represents a resource index of PUCCH format 1a/1b for ACK/NACK/DTX transmission, $N^{(1)}_{PUCCH}$ denotes a signaling value received from a higher layer, and $n_{CCE}$ denotes the smallest value of CCE indexes used for PDCCH transmission. A cyclic shift (CS), an orthogonal spreading code and a Physical Resource Block (PRB) for PUCCH formats 1a/1b are obtained from $n^{(1)}_{PUCCH}$.

Figure 10:
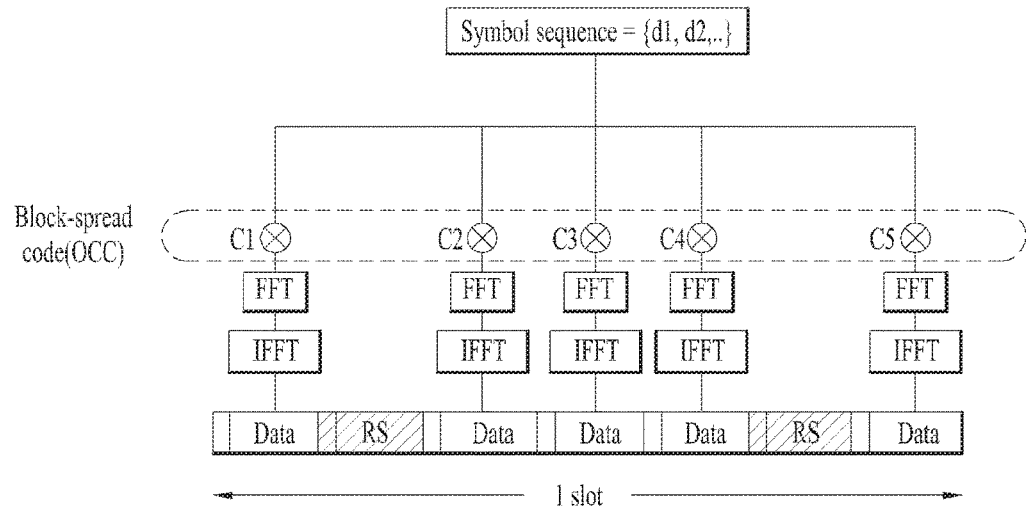
FIG. 10 illustrates the structure of PUCCH format 3 in a slot level.

FIG. 10 illustrates the structure of PUCCH format 3 in a slot level. PUCCH format 3 is used to transmit a plurality of ACK/NACK information, and information such as CSI and/or SR may be transmitted together.

Referring to FIG. 10, one symbol sequence is transmitted over the frequency domain, and OCC-based time-domain spreading is applied to the symbol sequence. Control signals of a plurality of UEs may be multiplexed into the same RB using OCCs. Specifically, 5 SC-FDMA symbols (i.e. a UCI data part) are generated from one symbol sequence {d1, d2, . . . } using a length-5 OCC. Here, the symbol sequence {d1, d2, . . . } may be a modulation symbol sequence or a codeword bit sequence. The symbol sequence {d1, d2, . . . } may be generated by performing joint coding (e.g., Reed-Muller coding, tail-biting convolutional coding, etc.), block-spreading, and SC-FDMA modulation on a plurality of ACK/NACK information.

ACK/NACK payload for PUCCH format 3 is configured per cell and then connected in cell index order. ACK/NACK payload is configured by targeting all cells set for a user equipment. In particular, HARQ-ACK feedback bit for $c^{th}$ serving cell (or DL CC) is given as $o_{c,0}^{ACK} o_{c,1}^{ACK}, \ldots , o_{c,O_c^{ACK}-1}^{ACK}$ ($c \geq 0$). $O^{ACK}_c$ indicates the bit number (i.e., size) of HARQ-ACK payload for the $c^{th}$ serving cell. For the $c^{th}$ serving cell, if a transmission mode of supporting a single transport block transmission is set or a space bundling is applied, it can be given as $O^{ACK}_c = B^{DL}_c$. The HARQ-ACK feedback bit is set to 1 if HARQ-ACK response is ACK (Positive Acknowledgement). If the HARQ-ACK response is NACK (Negative Acknowledgement) or DTX (Discontinuous Transmission), the HARQ-ACK feedback bit is set to 0.

On the contrary, for the $c^{th}$ serving cell, if a transmission mode of supporting a plurality of (e.g., 2) transport block transmissions is set and a space bundling is not applied, it can be given as $O^{ACK}_c = 2B^{DL}_c$. If HARQ-ACK bit is transmitted on PUCCH or W corresponding to PUSCH does not exist despite that HARQ-ACK feedback bit is transmitted on the PUSCH (e.g., SPS (Semi-Persistent Scheduling) based PUSCH), it can be given as $B^{DL}_c = M$. In this case, M indicates the number of elements within K set defined in table 3. If TDD UL-DL configurations include #1, #2, #3, #4 and #6 and HARQ-ACK feedback bit is transmitted on PUSCH, it can be given as $B^{DL}_c = W^{UL}_{DAI}$. In this case, $W^{UL}_{DAI}$ indicates a value indicated by UL DAI field in UL grant PDCCH and can be simply represented as W. If the TDD UL-DL configuration is #5, it can be given as $B^{DL}_c = W^{UL}_{DAI} + 4\lceil (U - W^{UL}_{DAI})/4 \rceil$. In this case, U indicates a maximum value among Ccs and the Uc indicates the total number of PDSCH(s) and PDCCH indicating (downlink) SPS release, which are received in subframe n−k in the $c^{th}$ serving cell. Subframe n is the subframe for transmitting HARQ-ACK feedback bit. And, ⌈ ⌉ indicates a ceiling function.

For the $c^{th}$ serving cell, if a transmission mode of supporting a single transport block transmission is set or a space bundling is applied, a location of each ACK/NACK within HARQ-ACK payload of the corresponding serving cell is given as $o_{c,DAI(k)-1}^{ACK}$. DAI(k) indicates DL DAI value of PDCCH detected from DL subframe n−k. On the contrary, for the $c^{th}$ serving cell, if a transmission mode of supporting a plurality of (e.g., 2) transport block transmissions is set and a space bundling is not applied, locations of each ACK/NACK in HARQ-ACK payload of the corresponding serving cell are given as $o_{c,2DAI(k)-2}^{ACK}$ and $o_{c,2DAI(k)-1}^{ACK}$. $o_{c,2DAI(k)-2}^{ACK}$ indicates HARQ-ACK for codeword 0 and $o_{c,2DAI(k)-1}^{ACK}$ indicates HARQ-ACK for codeword 1. The codeword 0 and the codeword 1 correspond to a transport block 0 and a transport block 0 or a transport block 1 and a transport block 0 according to swapping, respectively. If PUCCH format 3 is transmitted in a subframe configured for SR transmission, PUCCH format 3 transmits ACK/NACK bit and SR 1-bit together.

Embodiment: ACK/NACK (A/N) Transmission

Currently, in case of Rel-10/11/12 based LTE-A system, CA for maximum 5 cells/carriers (hereinafter commonly called cells) for a single user equipment can be supported and PUCCH carrying UCI (e.g., HARQ-ACK, CSI, etc.) associated with a plurality of the corresponding cells is transmitted through a single PCell only. Meanwhile, the next generation system may consider supporting CA for at least 5 or more cells for a single user equipment for the purpose of a higher data transmission rate. In this case, in consideration of a UCI size increase (attributed to the increasing number of CA configuring cells), it is able to consider introducing a new PUCCH format capable of supporting a payload of a size greater than that of an existing PUCCH format (e.g., PUCCH format 3). Moreover, in order to reduce a UCI transmission frequency/size increase (according to an increase of the CA configuration cell number) and a PUCCH resource load in PCell due to the increase, it may be able to consider a method of setting a PUCCH (UCI through it) transmission to be enabled through specific SCell (in addition to PCell).

Meanwhile, in an existing CA situation, as HARQ-ACK (for clarity, A/N) feedback transmission scheme, a method of PUCCH format 1b with channel selection (for clarity, CHsel) or a PUCCH format 3 (for clarity, PF3) based method can be set. First of all, the case of CHsel is basically applicable to a CA situation between 2 cells only and is a method of selecting/modulating a specific one of a plurality of PUCCH format 1b (for clarity, PF1) resources according to A/N state for all CA and then transmitting the specific one. In particular, in case that cross-CC scheduling is configured (to enable SCell to be scheduled from PCell), (CHsel candidate) PF1 resource corresponding to each cell can be allocated as an implicit PUCCH resource linked to DL grant transmission resource (e.g., (E)CCE) [refer to FIG. 9 and Formula 1]. Meanwhile, if the cross-CC scheduling is not configured, a resource corresponding to PCell is allocated as an implicit PF1. Yet, a resource corresponding to SCell can be allocates as a specific one (e.g., indicated by ARI (ACK/NACK resource indicator) in a DL grant for scheduling SCell) of a plurality of explicit PF1 (set) (previously) configured through an upper layer signal (e.g., radio resource control, RRC signal).

On the contrary, the PF3 method is applicable to a CA situation among maximum 5 cells, configures A/N (bit) corresponding to each cell as a single payload intactly, and is a method of mapping/transmitting a coded bit, which is generated by applying a series of coding (e.g., Reed Muller (RM) code) processes, to/on PF3 resource. In this case, PF3 resource used for A/N transmission can be allocated as a specific one (e.g., PF3 indicated by ARI in DL grant for scheduling SCell) of a plurality of PF3 (previously) configured through an upper layer signal (e.g., RRC) (irrespective of a presence or non-presence of cross-CC scheduling configuration). In particular, despite a situation that PF3 is configured for A/N transmission, if scheduling is performed on PCell (in case of FDD) or a single SF in PCell (in case of TDD) (i.e., a case that DL grant is detected), only A/N corresponding to the corresponding scheduling is transmitted using implicit PF1 linked to the DL grant (such an operation is named fallback). Otherwise, A/N for call CA configuration cells can be transmitted using PF3 indicated by ARI.

In case of a fallback operation in PF3, although CA is configured for a user equipment, in a situation that actual DL traffic (scheduling for this) is not considerable or small (in aspect of system overhead/load), the use of PUCCH format (i.e., PF3) occupying relatively considerable resources (e.g., orthogonal cover code for configuring PUCCH, cyclic shift, etc.) to provide a payload of a large size is reduced or voided. Instead, it is advantageous in that PF1 occupying less resources can be utilized. In the next generation system, a new PUCCH format (for clarity, PUCCH format 4 (PF4)), in which CA (i.e., enhanced CA (eCA)) is configured with more cells (e.g., 32 cells) and more resources are occupied for A/N feedback transmission corresponding to such CA, can be set. Hence, it may be efficient in system resource use aspect if fallback operation opportunities using PUCCH format (e.g., PF1) occupying less resources are increased as many as possible.

Figure 11:
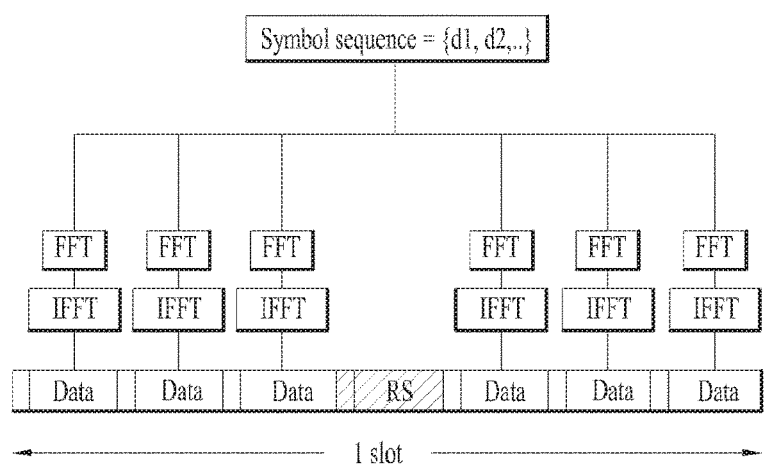
FIG. 11 illustrates the structure of PUCCH format 3 in a slot level.

FIG. 11 illustrates the structure of PUCCH format 4 on a slot level. PUCCH format 4 has a PUSCH-similar structure (cf. data region in FIG. 4). Namely, a single RS SC-FDMA symbol exists per slot and OCC is not applied to a time/symbol axis. Hence, a different information is carried on each UCI SC-FDMA symbol (data block in the drawing). For instance, a symbol sequence ({d1, d2 . . . }) can be sequentially carried from a first UCI SC-FDMA symbol to a last UCI SC-FDMA symbol. The symbol sequence ({d1, d2 . . . }) can be generated from a plurality of ACK/NACK through (joint) coding (e.g., Reed-Muller code, Tail-biting convolutional code, etc.). PF4 resource used for A/N transmission can be allocated as a specific one (e.g., PF4 indicated by ARI in DL grant for scheduling SCell) among a plurality of (previously) set PF4 through an upper layer signal (e.g., RRC) (irrespective of a presence or non-presence of cross-CC scheduling configuration).

Table 6 shows one example of indicating PUCCH resource for HARQ-ACK explicitly.

TABLE 6

| Value of HARQ-ACK resource for PUCCH (ARI) $n_{PUCCH}$ | |
| --- | --- |
| 00 | First PUCCH resource value configured by an upper layer |
| 01 | Second PUCCH resource value configured by an upper layer |
| 10 | Third PUCCH resource value configured by an upper layer |

TABLE 6-continued

| Value of HARQ-ACK resource for PUCCH (ARI) $n_{PUCCH}$ | |
| --- | --- |
| 11 | Fourth PUCCH resource value configured by an upper layer |

ARI: ACK/NACK Resource Indicator.

In Table 6, an upper layer includes an RRC layer and an ARI value can be indicated through PDCCH that carries DL grant. For instance, the ARI value can be indicated using a TPC (transmit power control) field of specific PDCCH.

In a TDD based CA system, a plurality of HARQ-ACK feedbacks for DL data receptions on a plurality of cells can be transmitted through a single UL SF. The HARQ-ACK feedback corresponding to each cell can be configured with a plurality of HARQ-ACKs (i.e., A/N) for the DL data reception in a specific DL SF set (for clarity, bundling window, refer to Table 4) in the corresponding cell. In a TDD based CA, A/N feedback can be efficiently performed based on DAT (downlink assignment index) signaling in DL/UL grant (DG/UG).

Figure 12:
FIG. 12 shows one example of DAI (downlink assignment index) assignment.

FIG. 12 shows one example of a count-/total-DAT assignment method. A counter-DAT (c-DAT) indicates a (scheduling) counter value of a cell-first type in a cell/SF domain. Namely, the counter-DAT can indicate a scheduled order of a cell scheduled (by DG DCI) among all cells, i.e., a scheduling order value by a cell/SF unit. The total-DAT (t-DAT) indicates a total of scheduling accumulated by DL SF (i.e., a total of cells scheduled by DG DCI). The c-/t-DAT is assumed as starting with 1.

Referring to FIG. 12, 4 cells Cell 1 to Cell 4 are assumed as CA-merged for a user equipment. And, a bundling window is assumed as configured with SF #1 to SF #3. As shown in FIG. 12, cell/SF resources of (Cell 1, SF #1), (Cell 2, SF #1), (Cell 4, SF #2), (Cell 1, SF #3) and (Cell 3, SF #3) are scheduled, but other cell/SF resources are not scheduled. In this case, scheduling means that a DL transmission requiring HARQ-ACK feedback on the corresponding cell/SF resource is performed. And, the DL transmission requiring the HARQ-ACK feedback includes PDSCH and SPS release PDCCH. For instance, PDSCH transmission may exist in (Cell 2, SF #1). In this case, PDCCH for scheduling PDSCH may be transmitted in (Cell 2, SF #1) (self-scheduling) or (Cell X, SF #1) (cross-carrier scheduling) according to a scheduling type. The cell X means a scheduling cell of Cell 1. SPS PDSCH is not accompanied by count-DAT/total-DAT, and the drawing shows one example of a case that PDSCH (and SPS release PDCCH) scheduled by PDCCH (DL DCI) is scheduled only. According to the present example, since the count-DAT indicates a counter value (scheduled) by a cell first scheme, 1 to 5 are indicated in order of (Cell 1, SF #1)⇒(Cell 2, SF #1)⇒(Cell 4, SF #2)⇒(Cell 1, SF #3)⇒(Cell 3, SF #3. Moreover, since the total-DAT indicates the scheduling total value accumulated according to DL SF, the total-DAT indicates total-DAT=2 in case of SF #1, total-DAT=3 in case of SF #2, and total-DAT=5 in case of DL SF #3. The total-DAT has the same value in the same SF. The count-/total-DAT is used for an HARQ-ACK transmitting process (HARQ-ACK payload configuration, HARQ-ACK bit location decision, DTX detection, etc.).

Although FIG. 12 shows one example of applying c-/t-DAI to TDD, the c-DAI or the t-DAI may be applicable to an FDD based eCA system.

Moreover, in a DL grant DCI for scheduling each cell in TDD situation, a counter value, which indicates the scheduled order of the DL data transmission corresponding to the corresponding DCI on a time axis, i.e., in a time (SF) domain within the bundling window of the corresponding cell, can be transmitted as a DAI (this is called a time-DAI and assumed as starting with 1).

In the following, in a situation that PF3 or PF4 (hereinafter commonly named PF4) is set for A/N feedback transmission corresponding to CA, the present invention proposes a PF1 based (single A/N) fallback method and operation for the case that a single DL data (e.g., PDSCH) is scheduled in a (specific) single cell (hereinafter called F-cell). The F-cell may mean a pre-designated single specific cell or a corresponding cell in case of scheduling a single DL data (e.g., PDSCH) in a single cell only. In the latter case, the F-cell means that a single DL data (e.g., PDSCH) is scheduled in a single cell only. In case of PF1 fallback, a user equipment transmits A/N for F-cell only through PF1 (cf. FIG. 8 and FIG. 9). In case of non-PF1 fallback, a user equipment can transmit A/N feedback for a plurality of cells through PF4 (cf. FIGS. 10 to 12). For instance, if a user equipment receives a scheduling of a single DL data (e.g., PDSCH) in a non-F-cell (a case that F-cell is pre-designated) or a scheduling of a plurality of DL data (e.g., PDSCH) in a plurality of cells, the user equipment can transmit A/N feedback for a plurality of the cells through PF4 [non-PF1 fallback].

The proposed methods can be categorized into three types including: 1) a case of no signaling for c-DAI; 2) a case of signaling c-DAI for both PCell and SCell; and 3) a case of signaling c-DAI for SCell only. For clarity, the conditions in each of the proposed methods assumes a case that a user equipment receives a scheduling of a single DL data for a single cell (F-cell) only and propose a corresponding (PF1 based) fallback operation. In other cases, the user equipment can transmit A/N feedback for a plurality of cells through PF4 according to a non-PF1 fallback operation.

Meanwhile, in the present invention, PCell may mean a cell configured to perform (A/N carrying) PUCCH transmission. In the present invention, TDD (or FDD) may include a case that PCell operates by TDD (or FDD). In the present invention, PDCCH may include EPDCCH (enhanced PDCCH) that is a control channel of a type of FDM with PDSCH, and DL SF may include a special SF configured in TDD. And, in the present invention, although PCell can schedule PCell or SCell according to a scheduling scheme, assume that SCell is unable to schedule PCell. Namely, SCell can schedule itself or other SCell only.

First of all, terminologies used in the present specification are summarized as follows.

HARQ-ACK: This indicates a reception response result for a DL transmission (e.g., PDSCH, DL SPS release PDCCH), i.e., ACK/NACK/DTX response (briefly, ACK/NACK response). The ACK/NACK/DTX response means ACK, NACK, DTX or NACK/DTX. HARQ-ACK for a specific cell or HARQ-ACK of a specific cell indicates ACK/NACK response to a DL signal (e.g., PDSCH) associated with a corresponding cell (i.e., scheduled to a corresponding cell). PDSCH may be substituted with transport block or codeword. HARQ-ACK is fed back for (i) SPS PDSCH, (ii) PDSCH scheduled by PDCCH (DG DCI) (hereinafter, normal PDSCH or non-SPS PDSCH), or (iii) DL SPS release PDCCH (DG DCI). SPS PDSCH is not accompanied by a corresponding PDCCH (DG DCI).

DL SPS release PDCCH: this means PDCCH indicating a DL SPS release.

SPS PDSCH: This means PDSCH transmitted in DL using a resource configured semi-statically by SPS. SPS PDSCH does not have a corresponding DL grant PDCCH (DG DCI). In the present specification, SPS PDSCH is interchangeably used with PDSCH without (w/o) PDCCH or SPS based PDSCH.

PDCCH (DG DCI) configured to schedule Cell #A, Cell #A scheduling PDCCH (DG DCI), PDCCH (DG DCI) for Cell #A: This indicates PDCCH (DG DCI) configured to schedule PDSCH on Cell #A. Namely, it indicates PDCCH (DG DCI) corresponding to PDSCH on CC #A. Or, it indicates DL SPS release PDCCH (DG DCI) transmitted on CC #A.

Scheduling for Cell #A, Cell #A scheduling: This means a transmission of PDSCH or DL SPS release PDCCH on Cell #A. Or, it may mean an operation or process related to a transmission of PDSCH or DL SPS release PDCCH on Cell #A. For instance, for the PDSCH transmission on Cell #A, it may mean that PDCCH configured to the corresponding PDSCH is transmitted.

Cell #A scheduled from Cell #B: For PDSCH transmission on Cell #A, it means that PDCCH configured to schedule the corresponding PDSCH is transmitted on Cell #B.

(1) Approach 1: without c-DAI

The present scheme may be applicable to a non-c-DAT signaling situation. Basically, TPC can be signaled through PDCCH configured to schedule PCell and ARI can be signaled through PDCCH configured to schedule SCell.

(a) Alt 1-1

A. Case of scheduling F-cell from PCell: User equipment can transmit A/N for F-cell only using an implicit PF1 resource (FIG. 9, cf. Formula 1) linked to PDCCH configured to schedule F-cell. In this case, the F-cell may be PCell or SCell.

i. ARI signaled through DL grant for PCell/SCell scheduled from PCell can indicate one of a plurality of PF4 resources. If F-cell is scheduled only, a user equipment can transmit A/N for the F-cell only using an implicit PF1 resource [PF1 fallback]. In other cases, the user equipment can transmit A/N for a plurality of cells using a PF4 resource indicated by the ARI [non-PF1 fallback]. For instance, in case that a plurality of cells are scheduled, the user equipment can transmit A/N for a plurality of cells using the PF4 resource indicated by the ARI.

ii. If A of Alt 1-1 is applied only, ARI signaled through DL grant for SCell #b scheduled from SCell #a can be set to indicate one of a plurality of PF4 resources. This is a situation that PF1 fallback is not applied, and a user equipment can transmit A/N for a plurality of cells using the PF4 resource indicated by the ARI. SCell #a and SCell #b may be equal to or different from each other.

B. Case that F-cell is scheduled from SCell and that corresponding PDCCH includes ARI indicating PF1 (or fallback): A/N of F-cell can be transmitted only using explicit PF1 resource (cf. Table 6) previously allocated through RRC. In this case, F-cell is SCell.

i. ARI signaled through DL grant for SCell #b scheduled from SCell #a can indicate one of a plurality of PF4 resources and one or more explicit PF1 resources. A user equipment may transmit A/N for F-cell only using PF1 resource indicated by the ARI [PF1 fallback] or transmit A/N for a plurality of cells using PF4 resource indicated by the ARI [non-PF1 fallback]. SCell #a and SCell #b may be equal to or different from each other.

(b) Alt 1-2

A. Case that F-cell is PCell or scheduled from PCell and that corresponding PDCCH includes ARI indicating PF1 (or fallback): This is equal to an operation A of Alt 1-1. In this case, F-cell may be PCell or SCell.

i. ARI signaled through DL grant for PCell/SCell scheduled from PCell can indicate one of a plurality of PF4 resources and implicit PF1 resource. If the ARI indicates the implicit PF1 resource, a user equipment can transmit A/N for F-cell only using the implicit PF1 resource (refer to Formula 1) linked to DL grant [PF1 fallback]. On the other hand, if the ARI indicates the PF4 resource, the user equipment can transmit A/N for a plurality of cells using the PF4 resource indicated by the ARI [non-PF1 fallback].

ii. If A of Alt 1-2 is applied only, ARI signaled through DL grant for SCell #b scheduled from SCell #a can indicate one of a plurality of PF4 resources. This is a situation that PF1 fallback is not applied, and a user equipment can transmit A/N for a plurality of cells using the PF4 resource indicated by the ARI. SCell #a and SCell #b may be equal to or different from each other.

B. Case that F-cell is scheduled from SCell and that corresponding PDCCH includes ARI indicating PF1 (or fallback): This is identical to the operation B of Alt 1-1. In this case, F-cell is SCell.

i. ARI signaled through DL grant for SCell #b scheduled from SCell #a can indicate one of a plurality of PF4 resources and one or more explicit PF1 resources. A user equipment may transmit A/N for F-cell only using PF1 resource indicated by the ARI [PF1 fallback] or transmit A/N for a plurality of cells using PF4 resource indicated by the ARI [non-PF1 fallback]. SCell #a and SCell #b may be equal to or different from each other.

(c) Alt 1-3

A. Case that F-cell is PCell: Identical to the operation A of Alt 1-1

B. Case that F-cell is SCell and that corresponding PDCCH includes ARI indicating PF1 (or fallback): Identical to the operation B of Alt 1-1 i. ARI signaled through DL grant for random SCell (e.g., SCell #b) can indicate one of a plurality of PF4 resources and one or more explicit PF1 resources. A user equipment may transmit A/N for F-cell only using PF1 resource indicated by the ARI [PF1 fallback] or transmit A/N for a plurality of cells using PF4 resource indicated by the ARI [non-PF1 fallback]. SCell #b may be scheduled from PCell or SCell #a. SCell #a and SCell #b may be equal to or different from each other.

The proposed scheme is also applicable to a situation of a presence of c-DAT signaling (irrespective of c-DAT value). Moreover, in case of A/B in Alt 1-1/2/3, 1) both A and B are applied, or 2) A or B is applicable (e.g., A). Meanwhile, considering a TDD situation, the F-cell condition of Alt 1-1/2/3 may be limited to a case that a corresponding PDCCH indicate time-DAT=1.

If both of the A and the B are applied, ARI of PDCCH for scheduling F-cell may be differently construed depending on whether the ARI of the PDCCH is scheduled from a prescribed cell. For instance, in case of Alt 1-1, ARI of PCell PDCCH can indicate PF4 resource only and ARI of SCell PDCCH can indicate one of PF4 resource and PF1 resource. In case of Alt 1-2, ARI of PCell PDCCH can indicate one of PF4 resource and implicit PF1 resource and ARI of SCell PDCCH can indicate one of PF4 resource and explicit PF1 resource.

(2) Approach 2: With c-DAI for Both PCell and SCell

The present scheme may be applicable to a situation that c-DAT is signaled to both PCell and SCell. Basically, in such a situation, TPC can be signaled through PDCCH corresponding to c-DAT=1 and ARI can be signaled through PDCCH corresponding to c-DAI>1.

(a) Alt 2-1

A. Case that F-cell is scheduled from PCell and that a corresponding PDCCH indicates c-DAT=1: User equipment can transmit A/N for F-cell only using an implicit PF1 resource (FIG. 9, cf. Formula 1) linked to PDCCH configured to schedule F-cell. In this case, the F-cell may be PCell or SCell.

i. ARI signaled through DL grant (corresponding to c-DAT=1) for PCell/SCell scheduled from PCell can indicate one of a plurality of PF4 resources. If a single data is scheduled for F-cell only, a user equipment can transmit A/N for the F-cell only using an implicit PF1 resource [PF1 fallback]. In other cases, the user equipment can transmit A/N for a plurality of cells using a PF4 resource indicated by the ARI [non-PF1 fallback]. For instance, in case that the F-cell is scheduled through DL grant (for a random cell) failing to correspond to c-DAT=1, the user equipment can transmit A/N for a plurality of cells using the PF4 resource indicated by the ARI within the corresponding DL grant.

ii. If A of Alt 2-1 is applied only, ARI signaled through DL grant (corresponding to a random c-DAT value) for SCell #b scheduled from SCell #a and DL grant (for a random cell) failing to correspond to c-DAT=1 can be also set to indicate one of a plurality of PF4 resources. This is a situation that PF1 fallback is not applied, and a user equipment can transmit A/N for a plurality of cells using the PF4 resource indicated by the ARI. SCell #a and SCell #b may be equal to or different from each other.

B. Case that F-cell is scheduled from SCell and that corresponding PDCCH includes ARI indicating PF1 (or fallback) by indicating c-DAT=1: A/N of F-cell can be transmitted only using explicit PF1 resource (cf. Table 6) previously allocated through RRC. In this case, F-cell is SCell.

i. ARI signaled through DL grant (corresponding to c-DAT=1) for SCell #b scheduled from SCell #a can indicate one of a plurality of PF4 resources and one or more explicit PF1 resources. A user equipment may transmit A/N for F-cell only using PF1 resource indicated by the ARI [PF1 fallback] or transmit A/N for a plurality of cells using PF4 resource indicated by the ARI [non-PF1 fallback]. SCell #a and SCell #b may be equal to or different from each other.

(b) Alt 2-2

A. Case that F-cell is PCell or scheduled from PCell and that corresponding PDCCH includes ARI indicating PF1 (or fallback) by indicating c-DAT=1: This is equal to an operation A of Alt 2-1. In this case, F-cell may be PCell or SCell.

i. ARI signaled through DL grant (corresponding to c-DAT=1) for PCell/SCell scheduled from PCell can indicate one of a plurality of PF4 resources and implicit PF1 resource. If the ARI indicates the implicit PF1 resource, a user equipment can transmit A/N for F-cell only using the implicit PF1 resource (refer to Formula 1) linked to DL grant [PF1 fallback]. On the other hand, if the ARI indicates the PF4 resource, the user equipment can transmit A/N for a plurality of cells using the PF4 resource indicated by the ARI [non-PF1 fallback].

ii. If A of Alt 2-2 is applied only, ARI signaled through DL grant (corresponding to a random c-DAT value) for SCell #b scheduled from SCell #a and DL grant (for a random cell) failing to correspond to c-DAT=1 can indicate one of a plurality of PF4 resources. This is a situation that PF1 fallback is not applied, and a user equipment can transmit A/N for a plurality of cells using the PF4 resource indicated by the ARI. SCell #a and SCell #b may be equal to or different from each other.

B. Case that F-cell is scheduled from SCell and that corresponding PDCCH includes ARI indicating PF1 (or fallback) by indicating c-DAT=1: This is identical to the operation B of Alt 2-1. In this case, F-cell is SCell.

i. ARI signaled through DL grant (corresponding to c-DAT=1) for SCell #b scheduled from SCell #a can indicate one of a plurality of PF4 resources and one or more explicit PF1 resources. A user equipment may transmit A/N for F-cell only using PF1 resource indicated by the ARI [PF1 fallback] or transmit A/N for a plurality of cells using PF4 resource indicated by the ARI [non-PF1 fallback]. SCell #a and SCell #b may be equal to or different from each other.

(c) Alt 2-3

A. Case that F-cell is PCell: Identical to the operation A of Alt 2-1

B. Case that F-cell is SCell and that corresponding PDCCH includes ARI indicating PF1 (or fallback) by indicating c-DAT=1: Identical to the operation B of Alt 2-1 i. ARI signaled through DL grant (corresponding to c-DAT=1) for random SCell (e.g., SCell #b) can indicate one of a plurality of PF4 resources and one or more explicit PF1 resources. A user equipment may transmit A/N for F-cell only using PF1 resource indicated by the ARI [PF1 fallback] or transmit A/N for a plurality of cells using PF4 resource indicated by the ARI [non-PF1 fallback]. SCell #b may be scheduled from PCell or SCell #a. SCell #a and SCell #b may be equal to or different from each other.

In the above proposed scheme, the SCell (and/or PCell) condition of becoming a fallback target may be limited to a case that a corresponding PDCCH includes ARI indicating PF1 (or fallback). Moreover, in case of A/B in Alt 2-1/2/3, 1) both A and B are applied, or 2) A or B is applicable (e.g., A). Meanwhile, in a TDD situation, the fallback target F-cell condition proposed in Alt 2-1/2/3 may be limited to a case that a corresponding PDCCH indicate time-DAT=1.

If both of the A and the B are applied, ARI of PDCCH for scheduling F-cell may be differently construed depending on whether the ARI of the PDCCH is scheduled from a prescribed cell. For instance, in case of Alt 2-1, ARI of PCell PDCCH can indicate PF4 resource only and ARI of SCell PDCCH can indicate one of PF4 resource and PF1 resource. In case of Alt 2-2, ARI of PCell PDCCH can indicate one of PF4 resource and implicit PF1 resource and ARI of SCell PDCCH can indicate one of PF4 resource and explicit PF1 resource.

(3) Approach 3: With c-DAI for SCell Only

The present scheme may be applicable to a situation that c-DAT is signaled to SCell only. Basically, TPC can be basically signaled through PDCCH configured to schedule PCell and ARI can be signaled through PDCCH configured to schedule SCell.

(a) Alt 3-1

A. Case that F-cell is PCell or scheduled from PCell and that a corresponding PDCCH includes ARI indicating PF1 (or fallback) by indicating c-DAT=1: User equipment can transmit A/N for F-cell only using an implicit PF1 resource (FIG. 9, cf. Formula 1) linked to PDCCH configured to schedule F-cell. In this case, the F-cell may be PCell or SCell.

i. ARI signaled through DL grant (corresponding to c-DAT=1) for PCell/SCell scheduled from PCell can indicate one of a plurality of PF4 resources and implicit PF1 resource. If the ARI indicates the implicit PF1 resource, a user equipment can transmit A/N for the F-cell only using the implicit PF1 resource (cf. Formula 1) linked to the DL grant [PF1 fallback]. On the other hand, if the ARI indicates the PF4 resource, the user equipment can transmit A/N for a plurality of cells using the PF4 resource indicated by the ARI [non-PF1 fallback].

ii. If A of Alt 3-1 is applied only, ARI signaled through DL grant (corresponding to a random c-DAT value) for SCell #b scheduled from SCell #a and DL grant (for a random cell) failing to correspond to c-DAT=1 can indicate one of a plurality of PF4 resources. This is a situation that PF1 fallback is not applied, and a user equipment can transmit A/N for a plurality of cells using the PF4 resource indicated by the ARI. SCell #a and SCell #b may be equal to or different from each other.

B. Case that F-cell is scheduled from SCell and that a corresponding PDCCH includes ARI indicating PF1 (or fallback) by indicating c-DAT=1: A user equipment can transmit A/N of F-cell only using explicit PF1 resource (cf. Table 6) previously allocated through RRC. In this case, F-cell is SCell.

i. ARI signaled through DL grant (corresponding to c-DAT=1) for SCell #b scheduled from SCell #a can indicate one of a plurality of PF4 resources and one or more explicit PF1 resources. A user equipment may transmit A/N for F-cell only using PF1 resource indicated by the ARI [PF1 fallback] or transmit A/N for a plurality of cells using PF4 resource indicated by the ARI [non-PF1 fallback]. SCell #a and SCell #b may be equal to or different from each other.

(b) Alt 3-2

A. Case that F-cell is PCell: This is equal to an operation A of Alt 3-1.

B. Case that F-cell is SCell and that a corresponding PDCCH includes ARI indicating PF1 (or fallback) by indicating c-DAT=1: This is equal to an operation B of Alt 3-1.

i. ARI signaled through DL grant (corresponding to c-DAT=1) for random SCell (e.g., SCell #b) can indicate one of a plurality of PF4 resources and one or more PF1 resources.

A user equipment can transmit A/N for F-cell only using the PF1 resource indicated by the ARI [PF1 fallback], or transmit A/N for a plurality of cells using the PF4 resource indicated by the ARI [non-PF1 fallback]. SCell #b may be scheduled from PCell or SCell #a. SCell #a and SCell #b may be equal to or different from each other.

In the above proposed scheme, the SCell condition of becoming a fallback target may be limited to a case that a corresponding PDCCH includes ARI indicating PF1 (or fallback). Moreover, in case of A/B in Alt 3-1/2, 1) both A and B are applied, or 2) A or B is applicable (e.g., A). Meanwhile, in a TDD situation, the fallback target F-cell condition proposed in Alt 3-1/2/3 may be limited to a case that a corresponding PDCCH indicate time-DAT=1.

If both of the A and the B are applied, ARI of PDCCH for scheduling F-cell may be differently construed depending on whether the ARI of the PDCCH is scheduled from a prescribed cell. For instance, in case of Alt 3-1, ARI of PCell PDCCH can indicate one of PF4 resource and implicit PF1 resource and ARI of SCell PDCCH can indicate one of PF4 resource and explicit PF1 resource.

Meanwhile, in the above proposed schemes all, the fallback (or PF1) indication through DL grant DCI may be indicated explicitly or implicitly by a method separate from ARI. Moreover, in the proposed scheme applied situation, if a user equipment receives both a PF1 indicating ARI and a PF4 indicating ARI, the user equipment may operate to select A/N transmission resource by applying the PF4 indicating ARI only in a manner of ignoring the PF1 indicating ARI.

Figure 13:
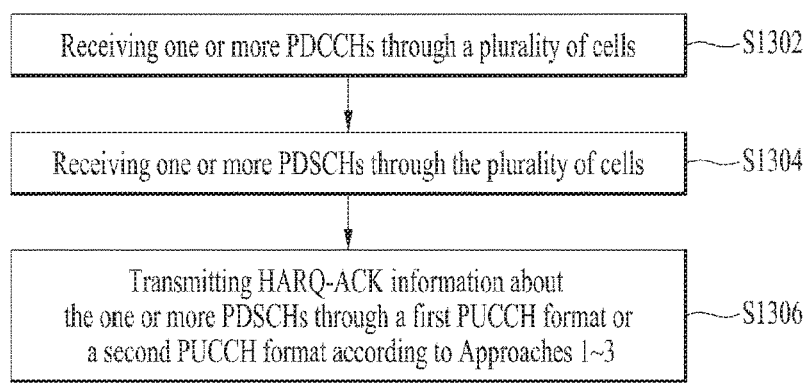
FIG. 13 shows one example of an ACK/NACK transmitting process according to the present invention.

FIG. 13 shows an example of an ACK/NACK transmitting process according to the present invention. Referring to FIG. 13, a user equipment receives at least one PDCCH through a plurality of cells [S1302] and is able to receive at least one PDSCH corresponding to it [S1304]. Thereafter, the user equipment can transmit HARQ-ACK information on the at least one PDSCH using a first PUCCH format or a second PUCCH format [S1306]. Herein, the first PUCCH format may indicate PF4, or the second PUCCH format may indicate PF1. Namely, the user equipment can perform PF1 fallback in accordance with a situation in a state that the PF4 is set for the HARQ-ACK transmission. A PF1 fallback condition and an operation corresponding to the condition may refer to Approach 1 to Approach 3.

Figure 14:
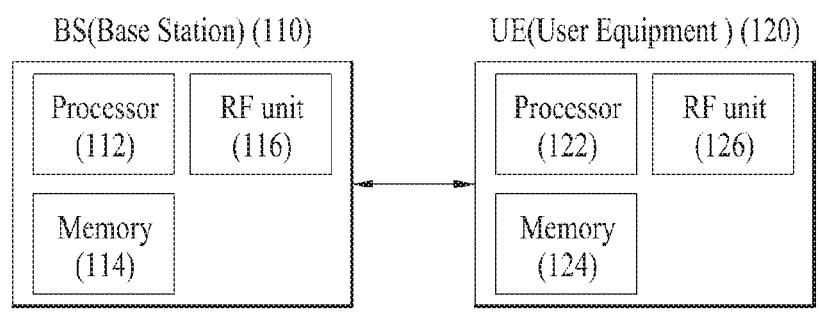
FIG. 14 illustrates a base station and a user equipment applicable to an embodiment of the present invention.

FIG. 14 illustrates a BS and a UE of a wireless communication system, which are applicable to embodiments of the present invention. When the wireless communication system includes a relay, the BS or UE can be replaced by the relay.

Referring to FIG. 14, the wireless communication system includes a BS 110 and a UE 120. The BS 110 includes a processor 112, a memory 114 and a radio frequency (RF) unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present invention. The memory 124 is connected to the processor 122 and stores information related to operations of the processor 122. The RF unit 126 is connected to the processor 122 and transmits and/or receives an RF signal. The BS 110 and/or the UE 120 may include a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to a wireless communication apparatus such as a UE, a BS or a relay.

What is claimed is:

1. A method of transmitting HARQ-ACK (hybrid ARQ acknowledgement) information by a user equipment in a wireless communication system, comprising:
   receiving a RRC (radio resource control) signal including first resource indexes for a first PUCCH (physical uplink control channel) format and second resource indexes for a second PUCCH format;
   receiving a PDCCH (physical control shared channel) having a HARQ-ACK resource indicator in a SCell (secondary cell) among a plurality of cells including a PCell (primary cell) and the SCell,
   wherein the HARQ-ACK resource indicator indicates one of the first or second resource indexes;
   receiving only a PDSCH (physical downlink shared channel) corresponding to the PDCCH in a specific cell among a plurality of the cells;
   when the HARQ-ACK resource indicator indicates one of the first resource indexes, transmitting HARQ-ACK information for the plurality of cells through the first PUCCH format using a PUCCH resource indicated by the HARQ-ACK resource indicator; and
   when the HARQ-ACK resource indicator indicates one of the second resource indexes, transmitting HARQ-ACK information only for the specific cell through the second PUCCH format using a PUCCH resource indicated by the HARQ-ACK resource indicator.

2. The method of claim 1, wherein the specific cell is the SCell.

3. The method of claim 1, wherein the first PUCCH format comprises either PUCCH format 3 or PUCCH format 4 and wherein the second PUCCH format comprises either PUCCH format 1a or PUCCH format 1b.

4. A user equipment used for a wireless communication system, comprising:

transceiver configured to transmit and/or receive an RF signal; and a processor connected to the transceiver and configured to: a receive a RRC (radio resource control) signal including first resource indexes for a first PUCCH (physical uplink control channel) format and second resource indexes for a second PUCCH format, receive a PDCCH (physical control shared channel) having a HARQ-ACK resource indicator in a SCell (secondary cell) among a plurality of cells including a PCell (primary cell) and the SCell, wherein the HARQ-ACK resource indicator indicates one of the first or second resource indexes, receive only a PDSCH (physical downlink shared channel) corresponding to the PDCCH in a specific cell among a plurality of the cells, when the HARQ-ACK resource indicator indicates one of the first resource indexes, transmit HARQ-ACK information for the plurality of cells through the first PUCCH format using a PUCCH resource indicated by the HARQ-ACK resource indicator, and when the HARQ-ACK resource indicator indicates one of the second resource indexes, transmit HARQ-ACK information only for the specific cell through the second PUCCH using a PUCCH resource indicated by the HARQ-ACK resource indicator.

5. The user equipment of claim 4, wherein the specific cell is the SCell.

6. The user equipment of claim 4, wherein the first PUCCH format comprises either PUCCH format 3 or PUCCH format 4 and wherein the second PUCCH format comprises either PUCCH format 1a or PUCCH format 1b.

* * * * *